(12) United States Patent
Benko et al.

(10) Patent No.: US 8,664,305 B2
(45) Date of Patent: Mar. 4, 2014

(54) FUNCTIONALIZED LIGNIN, RUBBER CONTAINING FUNCTIONALIZED LIGNIN AND PRODUCTS CONTAINING SUCH RUBBER COMPOSITION

(75) Inventors: David Andrew Benko, Munroe Falls, OH (US); Bruce Raymond Hahn, Hudson, OH (US); Martin Paul Cohen, Fairlawn, OH (US); Shawn Matthew Dirk, Albuquerque, NM (US); Kirsten Nicole Cicotte, Albuquerque, NM (US)

(73) Assignee: The Goodyear Tire & Rubber Company, Akron, OH (US)

( * ) Notice: Subject to any disclaimer, the term of this patent is extended or adjusted under 35 U.S.C. 154(b) by 412 days.

(21) Appl. No.: 12/684,231

(22) Filed: Jan. 8, 2010

(65) Prior Publication Data

US 2010/0204368 A1 Aug. 12, 2010

Related U.S. Application Data

(60) Provisional application No. 61/151,295, filed on Feb. 10, 2009.

(51) Int. Cl.
*C08L 97/00* (2006.01)
*B60C 1/00* (2006.01)

(52) U.S. Cl.
USPC ................ 524/73; 524/76; 524/495; 524/847

(58) Field of Classification Search
USPC ...................................... 524/72–76
See application file for complete search history.

(56) References Cited

U.S. PATENT DOCUMENTS

| 3,296,158 | A |   | 1/1967 | Dimitri et al. |         |
|-----------|---|---|--------|----------------|---------|
| 3,956,261 | A |   | 5/1976 | Lin            | 260/124 |
| 3,984,363 | A |   | 10/1976| D'Alelio       | 260/17.5|
| 4,477,612 | A | * | 10/1984| Boutsicaris    | 524/76  |
| 4,820,749 | A | * | 4/1989 | Beshay         | 523/203 |
| 5,102,991 | A |   | 4/1992 | Glasser et al. | 530/500 |
| 7,064,171 | B1| * | 6/2006 | Halasa et al.  | 526/340 |

FOREIGN PATENT DOCUMENTS

| JP | 05331319 A    | * | 12/1993 |
| JP | 2008308615 A  | * | 12/2008 |
| WO | WO 2005002530 A1 | * | 1/2005 |

OTHER PUBLICATIONS

Gregorova et al. ("Stabilization effect of lignin in natural rubber", Polymer Degradation and Stability, 91 (2006) 229-233).*
Machine translation of JP 05331319 A.*
Machine translation of JP 2008308615 A.*
"Role of Lignin Filler in Stabilization of Natural Rubber-Based Composition" by B. Košiková et al., published in *The Journal of Applied Polymer Science*, vol. 103, 1226-1231 (2007), by Wiley InterScience at least as early as 2006.
"Utilization of Lignins in Rubber Compounding" by M. G. Kumaran et al.; published in *The Journal of Applied Polymer Science*, vol. 22, 1885-1893 by John Wiley & Sons, Inc. at least as early as 1978.
"Lignin Reinforced Rubber Composition" by D. K. Setua et al.; published in *Polymer Composites*, vol. 21, No. 6, at least as early as Dec. 2000.
Pages 880 through 889, "Polyolefin/Lignosulfonate Blends, 9 Functionalized Polyolefin/Lignin Blends" by Cazacu, et al. Published in *Macromolecular Materials and Engineering*, vol. 289, on Oct. 13, 2004.
Chapter 16, pp. 551 through 598, *Bio-Based Polymers and Composites*, by Wool, et al. Published in 2005.
Pages 1 through 11, "Novel Lignine Containing Random Solution Styrene Butadiene Compound Vulcanizates", published in *ip.com Prior Art Database* on Oct. 15, 2009. Author unknown.
European Search Report completed Jun. 29, 2010.

* cited by examiner

*Primary Examiner* — Ling Choi
*Assistant Examiner* — Wenwen Cai
(74) *Attorney, Agent, or Firm* — Henry C. Young, Jr.

(57) ABSTRACT

The invention relates to functionalized lignin, rubber compositions which contain functionalized lignin and to products which have at least one component comprised of such rubber composition.

6 Claims, No Drawings

FUNCTIONALIZED LIGNIN, RUBBER CONTAINING FUNCTIONALIZED LIGNIN AND PRODUCTS CONTAINING SUCH RUBBER COMPOSITION

The Applicants hereby claim the benefit of prior U.S. Provisional Application Ser. No. 61/151,295, filed on Feb. 10, 2009.

This invention was made under a CRADA (SC01/01640) between The Goodyear Tire & Rubber Company and Sandia National Laboratories, operated for the United States Department of Energy. The government has certain rights in this invention.

FIELD OF THE INVENTION

The invention relates to functionalized lignin, rubber compositions which contain functionalized lignin and to products which have at least one component comprised of such rubber composition.

BACKGROUND OF THE INVENTION

Lignin is a biopolymer composed of a complex group of phenolic polymers that confer strength and rigidity to woody cell walls of various plants. The lignin is typically chemically recovered from the plants by various methods, including recovery as paper pulp byproducts. Lignin is typically required to be removed from wood pulp when the wood pulp is to be used for making paper. It can therefore be a byproduct from paper making processes, although lignin can be recovered by other processes.

In practice, lignin may be recovered from wood pulp by various processes such as for example, by solvent extraction from wood meal, which may sometimes be referred to as "Native Lignin" or "Brauns Lignin"; by cellulolytic enzyme treatment of finely ground wood meal followed by solvent extraction, which may sometimes be referred to as "Cellulolytic Enzyme Lignin"; by treatment of woody material with dioxane/dilute HCl, where come linkages are cleaved by such procedure, thus altering the lignin structure, which may sometimes be referred to as "Doxane Acidolysis Lignin"; by solvent extraction and purification of finely ground wood meal, which may sometimes be referred to as "Milled Wood Lignin"; by strong acid degradation of woody materials which is understood to drastically change the lignin structure which may sometimes referred to as "Klason Lignin"; by successive treatments of woody material with sodium periodate followed by boiling water, where the lignin is degraded in some degree, which may sometimes referred to as "Periodate Lignin"; by reaction with sodium hydroxide and $Na_2S$ at an elevated temperature followed by isolation through acidification or ultrafiltration. The resulting product (a byproduct of paper pulp making process) is water insoluble although it may be in a sulfomethylated, water soluble, form. It may sometimes be referred to as "Kraft Lignin"; by reaction with sulfur dioxide and metal bisulfite in an acidic medium and at an elevated temperature. The resulting water soluble lignosulfonates may contain sulfonated lignin polymers, sugars, sugar acids and small amounts of wood extractives and inorganic compounds. The product may be submitted to a purification process or chemical reaction to obtain the lignin. This may be one of the largest commercial sources of lignin. It may sometimes be referred to as "Lignosulfonates—from Acid Sulfite Pulping".

Other less significant sources of lignin are, for example, treating woody material with a metal bisulfite salt at an elevated temperature to yield a water soluble product containing 40 to 50 percent sulfonated lignin with the remainder being composed of sugar polymers, sugars, sugar acids, wood extractives and a significant inorganic compound content. They might sometimes be referred to as "Lignosulfonates from Bisulfite Pulping"; by treating woody material with a salts of bisulfite/sulfite prior to mechanical refining. The resulting water soluble product contains relatively low yields of lignin itself together with a variety of degradation products. It might sometimes be referred to as "Lignosulfonates from Neutral Sulfite-Semi Chemical Process"; by treatment of woody material with sodium sulfite and catalytic amount of anthraquinone at an elevated temperature. An impure yield of sulfonated lignin is obtained. While believed to not be a commercial product, it might, if desired, be referred to as "Lignosulfonates from Alkaline Sulfite-Anthraquinone Pulping"; by treatment of woody material with various organic solvent treatment processes which may result in a high percentage of purified lignin. The might, if desired, be referred to as "Organosolv Lignins".

For the purposes of this invention, such lignin products may be collectively referred to herein as "lignin" or "lignins".

While lignin, as a byproduct of various processes, may sometimes be disposed of by, for example, use as a fuel, lignin may sometimes find use for other purposes. For example, lignin has sometimes been suggested for use as a filler for various rubber compositions.

In practice, lignin is generally considered to be a biopolymer composed of several phenolic monomers in various ratios and in various configurations, depending somewhat upon its plant of origin and process used for its recovery. These aspects of lignin are recognized by those having skill in such art.

Accordingly, the nature of an individual lignin depends somewhat upon its plant of origin and recovery process.

Lignin is understood to generally and predominately contain, aromatic, hydroxyl, methoxyl, carbonyl and carboxy groups, or substituents. Lignosulfonates may also contain sulfonate moieties, or substituents.

For the purposes of this invention, such substituents may be collectively referred to herein as "resident substituents". It can be envisioned that most of such substituents are composed of chemically active hydroxyl groups.

For this invention, it is desired to functionalize the lignin through one or more of its various chemically active resident substituents, particularly those involving chemically active hydroxyl groups, with at least one functional group having a moiety reactive with at least one of such resident substituents.

For the purposes of this invention, such functionalized lignin may be referred to herein as "functionalized lignin".

It is envisioned herein that such functionalized lignin may be obtained, for example by esterification to form lignin ester and by silylation to form silylated lignin.

Further, it is envisioned herein that lignin may alternatively be provided in a form of digested lignin prior to its functionalization. Said digested lignin may be functionalized, for example, by esterification or silylation.

Digested lignin may be prepared by, for example, by treatment of lignin with a protic acid, such as for example, sulfuric acid, in order to digest the lignin to promote smaller sized lignin particles having an average particle size ranging from, for example, about 40 nanometers (nm) to about 1,200 nm. Such treated lignin may be referred to herein as "digested lignin".

In one aspect, it is proposed to provide such functionalized lignin to promote its use as a filler for reinforcement of elastomers. In another aspect, it is desired to provide such functionalized lignin as a reinforcing filler to promote replacement of at least a portion of rubber reinforcing fillers in a rubber composition, such as for example, rubber reinforcing carbon black.

It is further proposed to provide a product which contains at least one component of a rubber composition which contains such functionalized lignin. Representative of such products are, for example, tires and engineered products such as hoses, conveyor belts, transmission belts and shock absorbing elements for various purposes.

In the description of this invention, the term "phr" relates to parts by weight for a material or ingredient per 100 parts by weight elastomer(s)". The terms "rubber" and "elastomer" are used interchangeably unless otherwise indicated. The terms "cure" and "vulcanize" are used interchangeably unless otherwise indicated.

SUMMARY AND PRACTICE OF THE INVENTION

In accordance with this invention, functionalized lignin is provided which is comprised of lignin containing resident constituents comprised of at least one of hydroxyl, methoxyl, carbonyl, carboxy and sulfonate moieties, as well as aromatic components, wherein at least one of said resident constituents is functionalized with at least one functionalizing compound having a moiety reactive with at least one of said resident constituents (particularly hydroxyl groups).

Said functionalizing compound contains one or more functional moieties comprised of: anhydrides, esters, alkyl silanes, alkyl alkoxy silanes, alkyl halo silanes, organo alkoxysilane thiols, amino silanes, alkoxy silanes, and silanes; and said functional moieties which contain at least one functional group comprised of: amine, acrylate, methacrylate, thiol, isonitrile, nitrile, isocyanates, allyl, olefin, alkyne, ester, epoxide, sulfide, haloalkane, perhaloalkane, amide, carbonate, carbamate, sulfonyl, azidosulfonyl, sulfolane, hydroxyl, and aryl functional group.

Representative examples of such functionalizing compounds are, for example, (trimethoxysilyl) propyl methacrylate; allyltrimethoxysilane; 3-(trimethoxysilyl)propane-1-thiol; isobutyltrimethoxysilane; 3-(dimethoxysilyl)propane-1-thiol; ethyl acetate; acetic anhydride; valeric anhydride; hexanoic anhydride; glycerol triacetate; delta valerolactone; methyl caprate and methyl laurate.

In further accordance with this invention a rubber composition is provided which is comprised of:

(A) at least one elastomer, and
(B) reinforcing filler comprised of:
  (1) said functionalized lignin, or
  (2) a combination of said functionalized lignin, and at least one of rubber reinforcing carbon black and synthetic amorphous silica (e.g. precipitated silica), and
(C) optionally a coupling agent for said precipitated silica, if used, and said functionalized lignin.

The functionalization of the lignin may be accomplished by methods available to those having skill in such art and such functionalization methods are not intended to be limited herein.

The lignin may be functionalized prior to its addition to said rubber composition or, alternatively, functionalized in situ within the rubber composition. In practice, it is desirably functionalized prior to its addition to the rubber composition.

A significant aspect of this invention is use of functionalized lignins as reinforcing fillers in rubber compositions.

This is considered herein to be significant in a sense of using widely available, low cost, renewable materials, namely lignin, as compared to use of petroleum derived materials.

In further accordance with this invention, a tire is provided having at least one component comprised of said rubber composition which contains at least one of said functionalized lignins. Such tire component may be, for example, which is not intended to be limiting, a tread, innerliner, sidewall carcass ply, and wire coat. In one embodiment, such tire component is generally intended to be exclusive of siloxane functionalized lignins as well as siloxane based elastomers.

Vehicular tracks having at least one component comprised of said rubber composition containing at least one of said functionalized lignins are also contemplated. In one embodiment, such vehicular track component is generally intended to be exclusive of siloxane functionalized lignins as well as siloxane based elastomers.

In additional accordance with this invention, an engineered product is provided comprised of, for example, hose, power transmission belts including automotive belts, conveyor belts and shock absorbing components for various articles of manufacture, such as for example and not intended to be limiting, motor mounts, marine dock fenders and air springs. In one embodiment, such engineered product component is generally intended to be exclusive of siloxane functionalized lignins as well as siloxane based elastomers.

Said coupling agent for use for the rubber composition of this invention may be any suitable coupling agent such as coupling agents which contain a moiety (e.g. alkoxy, halide or amino moiety) reactive with hydroxyl groups (e.g. silanol groups) on said precipitated silica and optionally with at least one of said aromatic, hydroxyl, methoxyl, carbonyl, carboxy and sulfonate substituents contained by said lignin and another, different moiety interactive with carbon-to-carbon double bonds or the accompanying allylic positions contained in said elastomer.

Representative of various coupling agents are, for example, comprised of bis(3-alkoxysilylalkyl) polysulfides having an average of from about 2 to about 4, alternately from about 2 to about 2.6, and alternately from about 3 to about 3.8, connecting sulfur atoms in its polysulfidic bridge and organomercaptosilanes.

Representative of such bis(3-trialkoxysilylaklyl) polysulfides is, for example, comprised of bis(3-triethoxysilylpropyl) polysulfide.

In the practice of this invention, the elastomers for said rubber composition may be comprised of various conjugated diene-based elastomers. Such diene-based elastomers may be polymers and copolymers of at least one conjugated diene, comprised of, for example, isoprene and 1,3-butadiene, and copolymers of a vinyl aromatic compound such as, for example, styrene and alpha methylstyrene, usually styrene, and at least one conjugated diene hydrocarbon comprised of, for example isoprene and 1,3-butadiene.

For the purposes of this invention silicone rubbers are also contemplated which contain said functionalized lignin.

For example, representative elastomers are cis 1,4-polyisoprene rubber (natural and synthetic), c is 1,4-polybutadiene rubber, vinyl polybutadiene rubber having a vinyl 1,2 content in a range of about 10 percent to about 90 percent, styrene/butadiene copolymer (SBR) rubber (aqueous emulsion or organic solution polymerization prepared copolymers), styrene/isoprene/butadiene terpolymer rubber, butadiene/acrylonitrile rubber, styrene/isoprene copolymer as well as isoprene/butadiene copolymer rubber, 3,4-polyisoprene rubber, siloxanes and trans 1,4-polybutadiene rubber.

Further representative elastomers are low unsaturation elastomers (elastomers with low carbon-to-carbon double bond contents) comprised of butyl rubber (copolymers of isobutylene and a minor amount of diene monomers comprised of isoprene as are well known to those having skill in such art), halobutyl rubber (halogenated butyl rubber, namely butyl rubber halogenated with chlorine or bromine) and brominated copolymers of isobutylene and p-methylstyrene.

The elastomer(s) may also be comprised of at least one functionalized diene-based elastomer as polymers of at least one of isoprene and 1,3-butadadiene and copolymers of styrene and at least one of isoprene or alpha methylstyrene and 1,3-butadiene such as, for example, (A) functionalized diene-based elastomer which contains one or more functional groups available for reaction with or interaction with said functionalized lignin and/or precipitated silica filler, wherein said functional groups are selected from at least one of terminal and/or pendant hydroxyl and carboxyl groups, and (B) functionalized diene-based elastomer which contains at least one terminal and/or pendant functional group available for reaction with or interaction with said functionalized lignin and/or precipitated silica and elected from at least one of isocyanate groups, blocked isocyanate groups, epoxide groups, amine groups such as for example primary amine groups, secondary amine groups and heterocyclic amine groups, hydroxypropyl methacrylate (HPMA) groups, acrylate groups, anhydride groups and hydroxyl groups.

Such functionalized types of elastomers are understood to be known to those having skill in such art.

The diene-based elastomer which contains reactive hydroxyl groups and/or carboxyl groups, may be prepared, for example, by organic solvent polymerization of isoprene and/or 1,3-butadiene or copolymerization of styrene or alpha methylstyrene with isoprene and/or 1,3-butadiene.

The introduction of reactive hydroxyl and/or carboxyl groups on said diene-based elastomer may be accomplished by, for example, radical grafting one or more functional groups of interest onto the polymer backbone, copolymerization of polymerizable materials which contain one or more functional groups of interest, deprotection of protected copolymerized groups, addition to a fraction of the unsaturated backbone, and for end terminated polymers a reaction of the living polymer chain with a molecule containing the function of interest. An amine group may be introduced in a styrene/butadiene copolymer, for example, by first modifying the styrene monomer with a pyrrolidone and then copolymerizing the modified styrene with 1,3-butadiene monomer.

Exemplary of such diene-based elastomers which contain hydroxyl and/or polar functional groups and multifunctional compatibilizers are, for example hydroxyl terminated polybutadienes, hydroxyl terminated polyisoprenes, anhydride-containing polybutadiene and/or polyisoprene elastomers, and epoxide-containing elastomer such as, for example, an epoxidized natural rubber (epoxidized cis 1,4-polyisoprene).

Organic solvent polymerization prepared tin coupled elastomers such as for example, tin coupled styrene/butadiene copolymers may also be used.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

It is readily understood by those having skill in the art that the rubber composition may be prepared by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above would be expected to be selected and used in conventional amounts.

The presence and relative amounts of the above additives are not considered to be an aspect of the present invention, unless otherwise indicated, which is more primarily directed to a rubber composition and products containing components of such rubber composition which contain the functionalized lignin.

The rubber products can be built, shaped, molded and cured by various methods which will be readily apparent to those having skill in such art.

The following examples are provided to further illustrate the invention in which the amounts and percentages of materials are by weight unless otherwise indicated.

EXAMPLE I

Esterified and Silylated Lignins

Functionalized lignins were prepared by functionalizing a lignin in a form of a water soluble sodium lignosulfonate obtained as Vanisperse™ CB from the Borregaard LignoTech company which contained sulfonate constituents and one or more of resident methoxyl, carbonyl and carboxy groups, or substituents.

Functionalized lignin in a from of esterified lignin was prepared by esterifying the lignosulfonate with acetic anhydride in the presence of a catalyst composed of 1-methylimidazole followed by chloroform extraction of the esterified lignin.

Functionalized lignin in a form of esterified lignin was prepared by esterifying the lignosulfonate with via a Lewis acid reaction, namely with acetic anhydride in the presence of zinc chloride catalyst. The product was soluble in chloroform.

Functionalized lignin in a form of esterified lignin was prepared by esterifying the lignosulfonate via a Lewis acid reaction with acetic anhydride in the presence of p-toluene sulfonic acid catalyst.

Functionalized lignin in a form of esterified lignin was prepared by esterifying the lignosulfonate via a Lewis acid reaction, namely with valeric anhydride in the presence of zinc chloride catalyst. The product was soluble in chloroform.

Functionalized lignin in a form of esterified lignin was prepared by esterifying the lignosulfonate via a Lewis acid reaction, namely with hexanoic anhydride in the presence of zinc chloride catalyst. The product was soluble in chloroform.

Functionalized lignin in a form of esterified lignin was prepared by esterifying the lignosulfonate via a transesterification reaction with ethyl acetate in the presence of p-toluene sulfonic acid catalyst.

Functionalized lignin in a form of esterified lignin was prepared by esterifying the lignosulfonate via a transesterification reaction with glycerol triacetate in the presence of p-toluene sulfonic acid catalyst.

Functionalized lignin in a form of esterified lignin was prepared by esterifying the lignosulfonate with methyl caprate via a transesterification reaction in the presence of p-toluene sulfonic acid catalyst.

Functionalized lignin in a form of esterified lignin was prepared by individually esterifying the lignosulfonate with methyl esters, with methyl caprate and methyl laurate.

Functionalized lignin in a form of silylated lignin was prepared by individually silylating the lignosulfonate with (trimethoxysilyl)propyl methacrylate in toluene solvent.

Functionalized lignin in a form of silylated lignin was prepared by individually silylating the lignosulfonate with allyltrimethoxysilane in toluene solvent.

Functionalized lignin in a form of silylated lignin was prepared by individually silylating the lignosulfonate with isobutyltrimethoxysilane in toluene solvent.

Functionalized lignin in a form of silylated lignin was prepared by individually silylating the lignosulfonate with 3-(trimethoxysilyl)propane-1-thiol, as an organoalkoxy thiol, in toluene solvent.

Functionalized lignin in a form of silylated lignin was prepared by individually silylating the lignosulfonate with 3-(dimethoxysilyl)propane-1-thiol, as an organoalkoxy thiol, in toluene solvent.

Accordingly, it is envisioned that a silylated lignin may be prepared, for example, by silylating an lignosulfonate with an alkoxysilane which may be in a form comprised of, for example, of an alkoxysilane, organoalkoxysilane such as an alkylalkoxysilane or organoalkoxysilane thiol.

While toluene solvent was used in the above preparation of individual functionalized lignin by the indicated silylating of lignosulfonate, it is recognized that other solvents may be used, where appropriate such as, for example, solvents comprised of at least one of, where compatible (e.g. compatible in a sense that they may be appropriately used with each other and/or said alkoxysilanes), xylene; aliphatic and cycloaliphatic hydrocarbon solvents as well as alkyl and cycloalkyl solvents comprised of, for example, hexane and cyclohexane; methylene chloride; chloroform; dichloroethane; styrene and tetrahydrofuran; and nitrogen containing solvents comprised of, for example, pyrrole, pyridine, vinyl pyridine, piperidine, dimethylformamide and dimethyl acetamide.

A summary of a portion of the above prepared functionalized lignins, in a form of esterified lignins as well as silylated lignins used for rubber compounding evaluations, is presented in the following Table 1.

TABLE 1

| (Esterified Lignin) | |
|---|---|
| Esterified Lignin (esterified lignosulfonate) | Esterification Means |
| Functionalized (esterified) Lignin A | acetic anhydride |
| Functionalized (esterified) Lignin B | methyl decanoate |
| (Silylated Lignin) | |
| Silylated Lignins (silated lignosulfonate) | Silylation Means |
| Functionalized (silated) Lignin C | 3-(dimethoxysilyl)propane-1-thiol |

TABLE 1-continued

| | |
|---|---|
| Funtionalized (silated) Lignin D | 3-(trimethoxysilyl)propane-1-thiol |
| Functionalized (silated) Lignin E | isobutyltrimethoxysilane |

EXAMPLE II

Samples of rubber compositions were prepared, as illustrated in the following Table 2, by blending the ingredients in an internal rubber mixer using two separate, sequential, mixing stages, or steps, namely a first relatively high maximum temperature non-productive mixing stage followed by a second, significantly lower maximum temperature productive mixing stage.

Sample A represents a Control rubber sample which does not contain a lignin and relies upon reinforcing filler as rubber reinforcing carbon black.

Samples B, C and D represent secondary Control rubber samples which contains lignin.

Experimental rubber Samples E through Z contain functionalized lignin in a form of esterified and silylated lignins.

Table 2 represents a basic rubber formulation for evaluation of said functionalized lignins.

TABLE 2

| Material | Parts |
|---|---|
| First Non-Productive Mix Step (NP1) to about 170° C. | |
| Solution polymerization prepared SBR (S-SBR)[1] | 65 |
| Cis 1,4-polybutadiene rubber[2] | 35 |
| Fatty acid[3] | 1.5 |
| Carbon black[4] | 50 to 65 |
| Lignin[5] | 0 to 15 |
| Functionalized lignin[6] | 0 to 15 |
| Coupling agent[7] | 0 to 2.4 |
| Zinc oxide | 2.5 |
| Wax | 1 |
| Productive Mix Step (PR) to about 110° C. | |
| Sulfur | 1 |
| Accelerators[8] | 1.5 |
| Antioxidant[9] | 0.5 |

[1]S-SBR rubber as Solflex ™ 16S42 from the Goodyear Tire & Rubber Company
[2]cis 1,4-polybutadiene rubber as Budene ™ 1208 from the Goodyear Tire & Rubber Company
[3]Mixture comprised of stearic, palmitic and oleic acids
[4]N660 Carbon Black, an ASTM designation
[5]Lignosulfate (sodium salt) from Borregaard LignoTech
[6]Functionalized lignin in a form of esterified or silylated lignosulfate
[7]Composite of carbon black carrier and coupling agent (in a 50/50 weight ratio) comprised of bis(3-triethoxysilylpropyl) polysulfide having an average of from about 3.2 to about 3.8 connecting sulfur atoms in its polysulfidic bridge as Si69 ™ from Evonik Degussa.
[8]Combination of sulfenamide and diphenyl guanidine sulfur vulcanization accelerators
[9]Antioxidants of the p-phenylenediamine type The rubber Samples were cured at a temperature of about 150° C. for about 40 minutes and various physical properties reported in Tables 3 and 3A for rubber Samples A through M and Tables, 4 and 4A for rubber Samples N through Z.

TABLE 3

| | Samples | | | | | | |
|---|---|---|---|---|---|---|---|
| | A | B | C | D | E | F | G |
| Carbon black (phr) | 50 | 50 | 50 | 50 | 50 | 50 | 50 |
| Lignin (lignosulfate) (phr) | 0 | 5 | 10 | 15 | 0 | 0 | 0 |
| Functionalized (esterified) lignin A (phr) | 0 | 0 | 0 | 0 | 5 | 10 | 15 |
| Coupling agent (phr) | 0 | 0 | 0 | 0 | 0 | 0 | 0 |

TABLE 3-continued

|  | Samples | | | | | | |
| --- | --- | --- | --- | --- | --- | --- | --- |
|  | A | B | C | D | E | F | G |
| MDR[1], 150° C., 60 minutes | | | | | | | |
| Maximum torque (dNm) | 16.5 | 16.9 | 17.5 | 18.3 | 17.1 | 19.1 | 18 |
| Minimum torque (dNm) | 1.9 | 2.3 | 2.5 | 2.7 | 2.3 | 2.6 | 3 |
| T90 (minutes) | 28.5 | 23.8 | 22.6 | 22.3 | 22.5 | 21.8 | 20.9 |
| RPA[2] (Cured rubber), 100° C., 10% strain, 1 Hertz | | | | | | | |
| Elastic storage modulus G' at 50% strain, (kPa) - higher is better | 1392 | 1436 | 1540 | 1613 | 1482 | 1588 | 1706 |
| Tan delta | 0.06 | 0.06 | 0.06 | 0.06 | 0.05 | 0.06 | 0.06 |
| Stress-strain (ATS)[3] | | | | | | | |
| Modulus, ring, 300 percent, (MPa) | 13.8 | 12.3 | — | 12.4 | 13.5 | — | — |

TABLE 3A

|  | Samples | | | | | |
| --- | --- | --- | --- | --- | --- | --- |
|  | H | I | J | K | L | M |
| Carbon black (phr) | 0 | 0 | 0 | 0 | 0 | 0 |
| Lignin (lignosulfate) (phr) | 0 | 0 | 0 | 0 | 0 | 0 |
| Functionalized (esterified) lignin A (phr) | 5 | 10 | 15 | 0 | 0 | 0 |
| Functionalized (silylated) lignin E (phr) | 0 | 0 | 0 | 5 | 10 | 15 |
| Coupling agent | 0.8 | 1.6 | 2.4 | 0 | 0 | 0 |
| MDR[1], 150° C., 60 minutes | | | | | | |
| Maximum torque (dNm) | 18 | 17.5 | 17 | 17.5 | 18 | 19 |
| Minimum torque (dNm) | 2.1 | 2.1 | 2.2 | 2.2 | 2.6 | 2.8 |
| T90 (minutes) | 36.1 | 43.8 | 43.5 | 22.9 | 22.3 | 22.3 |
| RPA[2] (Cured rubber), 100° C., 10% strain, 1 Hertz | | | | | | |
| Elastic storage modulus G' at 50% strain, (kPa) - higher is better | 1694 | 1646 | 1652 | 1515 | 1603 | 1675 |
| Tan delta | 0.07 | 0.07 | 0.06 | 0.05 | 0.06 | 0.06 |
| Stress-strain (ATS)[3] | | | | | | |
| Modulus, ring, 300 percent, (MPa) | 12.8 | 11.1 | 9.4 | NA | NA | 12.4 |
| Elongation at break (%) | 301 | 306 | 280 | 293 | 294 | 262 |

[1]Stress-Strain test
[2]Rubber Process Analyzer (RPA)
[3]Data according to Automated Testing System (ATS) instrument. For the cured rubber, a lower modulus G' (relative lower stiffness) at 1 percent strain is considered herein as being better in a sense of promoting tire handling at lower vehicular speeds and accompanying reduced internal tread rubber heat buildup, whereas a higher modulus G' (relative higher stiffness) at 50 percent strain is considered herein as being desirable in a sense of promoting tire handling at higher vehicular speeds and accompanying increased internal tread rubber heat buildup.

TABLE 4

|  | Samples | | | | | | |
| --- | --- | --- | --- | --- | --- | --- | --- |
|  | N | O | P | Q | R | S | T |
| Carbon black (phr) | 50 | 55 | 60 | 65 | 0 | 0 | 0 |
| Functionalized (silylated) lignin C (phr) | 0 | 0 | 0 | 0 | 5 | 10 | 15 |
| MDR[1], 150° C., 60 minutes | | | | | | | |
| Maximum torque (dNm) | 16 | 17.1 | 18.1 | 19.9 | 3.1 | 10.2 | 10.7 |
| Minimum torque (dNm) | 2 | 2.2 | 2.4 | 2.7 | 0.1 | 1.5 | 1.6 |
| T90 (minutes) | 26.8 | 25.4 | 25.1 | 24 | 54.2 | 25.7 | 25.4 |
| RPA[2] (Cured rubber), 100° C., 10% strain, 1 Hertz | | | | | | | |
| Elastic storage modulus G' at 50% strain, (kPa) - higher is better | 1391 | 1470 | 1570 | 1781 | 1436 | 1540 | 1613 |
| Tan delta | 0.06 | 0.06 | 0.07 | 0.07 | 0.06 | 0.06 | 0.06 |

TABLE 4A

| | Samples | | | | | |
|---|---|---|---|---|---|---|
| | U | V | W | X | Y | Z |
| Carbon black (phr) | 0 | 0 | 0 | 0 | 0 | 0 |
| Functionalized (silylated) lignin D (phr) | 5 | 10 | 15 | 0 | 0 | 0 |
| Functionalized (esterified) lignin B (phr) | 0 | 0 | 0 | 5 | 10 | 15 |
| MDR[1], 150° C., 60 minutes | | | | | | |
| Maximum torque (dNm) | 16.3 | 16.6 | 16.9 | 15.9 | 13.6 | 12.7 |
| Minimum torque (dNm) | 2.4 | 2.6 | 2.9 | 2 | 2 | 2 |
| T90 (minutes) | 18.6 | 14 | 11.8 | 29.1 | 34.9 | 36.4 |
| RPA[2] (Cured rubber), 100° C., 10% strain, 1 Hertz | | | | | | |
| Elastic storage modulus G' at 50% strain, (kPa) - higher is better | 1436 | 1540 | 1613 | 1482 | 1588 | 1706 |
| Tan delta | 0.06 | 0.06 | 0.06 | 0.05 | 0.06 | 0.06 |

From Tables 3 and 3A it is seen that the functionalized lignin with coupling agent (Samples H, I, and J) impart a higher stiffness with lower than delta than the functional lignin without the coupling agent.

The data in Table 3 shows that the esterified lignin (Samples E, F, and G) results in a higher elastic storage modulus than the non-treated lignin (Samples B, C, and D). This is indicative of improved polymer filler interaction due to the functionalization.

The elastic storage modulus values for the silylated lignin E (samples K, L, and M) are higher than the values for the untreated lignin. This again is indicative of an improved polymer filler interaction due to the functional group on the lignin.

The tan delta values, a measure of compound hysteresis, for the functionalized lignin samples (E, F, G, K, L, and M) are all as low as the untreated lignin samples (B, C, and D) while their G' values are higher. This is also indicative of improved polymer filler interaction and a indicator of lower tire rolling resistance.

From Tables 3 and 3A it is seen that the functionalized lignin with coupling agent (Samples H, I, and J) impart a higher stiffness with lower tan delta than the functional lignin without the coupling agent.

This is considered herein to be significant in the sense of promoting lower rolling resistance for a tire with a tread of such rubber composition and an associated vehicular fuel economy as a combination of lower tan delta with higher stiffness is an indicator of lower tire rolling resistance.

From Tables 3 and 3A it is also seen that the functionalized lignins impart a higher stiffness to the rubber compounds than the unfunctionalized lignins for comparable lignin contents. For example, see Samples E through M with the functionalized lignins as compared to Samples B, C, and D without the functionalized lignins.

This is considered herein to be significant in the sense of the functional groups providing better interaction between the lignin and the polymer matrix resulting in better reinforcement of the rubber.

From Table 4A it is seen that when Functionalized (esterified) Lignin B is added to the formulation, it results in similar stiffness or modulus levels when compared to equivalent levels of additional carbon black added to the formulation. For example, see Samples X, Y, and Z using a functionalized lignin without carbon black compared to samples O, P, and Q using carbon black without functionalized lignin.

This is considered herein to be significant in the sense of the reinforcement properties of the Functionalized (esterified) Lignin B indicate that a suitable replacement of carbon black is possible with this lignin.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a component comprised of a rubber composition comprised of:
    (A) at least one conjugated diene-based elastomer consisting of at least one of polymers and copolymers consisting of at least one conjugated diene selected from isoprene and 1,3-butadiene, and copolymers consisting of styrene with at least one conjugated diene selected from isoprene and 1,3-butadiene, and
    (B) reinforcing filler without synthetic amorphous silica consisting of:
        (1) silylated lignosulfonate, or
        (2) a combination of silylated lignosulfonate and rubber reinforcing carbon black,
    wherein said lignosulfonate contains sulfonate constituents and one or more of resident hydroxyl, methoxyl, carbonyl, and carboxy moieties,
    wherein said lignosulfonate is silylated with at least one of (trimethoxysilyl)propyl methacrylate; allyltrimethoxysilane; 3-(trimethoxysilyl)propane-1-thiol; isobutyltrimethoxysilane and 3-(dimethoxysilyl)propane-1-thiol.

2. The tire of claim 1 wherein said reinforcing filler for the rubber composition is said silylated lignosulfonate.

3. The tire of claim 1 wherein said reinforcing filler for the rubber composition consists of said silylated lignosulfonate and rubber reinforcing carbon black.

4. The tire of claim 1 wherein said lignosulfonate is silylated with (trimethoxysilyl)propyl methacrylate.

5. The tire of claim 1 wherein said elastomer consists of at least one of cis 1,4-polyisoprene rubber, cis 1,4-polybutadiene rubber, polybutadiene rubber having a vinyl 1,2 content in a range of about 10 percent to about 90 percent, styrene/butadiene copolymer rubber, styrene/isoprene/butadiene terpolymer rubber, styrene/isoprene copolymer, isoprene/butadiene copolymer rubber, 3,4-polyisoprene rubber, and trans 1,4-polybutadiene rubber.

6. The tire of claim 1 wherein said reinforcing filler consists of said silylated lignosulfonate and carbon black.

* * * * *